United States Patent [19]

Choi

[11] Patent Number: 5,732,303
[45] Date of Patent: Mar. 24, 1998

[54] DETECTOR USING BAR CODE FOR DETECTING THE MAXIMUM/MINIMUM DIAPHRAGM ADJUSTMENT VALUE OF AN EXCHANGE LENS

[75] Inventor: Jong-Sung Choi, Kyungki-do, Rep. of Korea

[73] Assignee: Samsung Aerospace Industries, Ltd., Kyungsangnam-do, Rep. of Korea

[21] Appl. No.: 850,868

[22] Filed: May 2, 1997

Related U.S. Application Data

[63] Continuation of Ser. No. 630,850, Apr. 11, 1996, abandoned.

[30] Foreign Application Priority Data

Apr. 14, 1995 [KR] Rep. of Korea .................. 95-8815

[51] Int. Cl.$^6$ .................................................. G03B 7/93
[52] U.S. Cl. ........................... 396/532; 396/505; 396/529
[58] Field of Search ........................... 354/286, 289.1, 354/289.11, 289.12; 396/505, 529, 530, 532

[56] References Cited

U.S. PATENT DOCUMENTS 4,236,803  12/1980  Shimomura ........................... 354/286

Primary Examiner—Daniel P. Malley
Attorney, Agent, or Firm—Finnegan, Henderson, Farabow, Garrett & Dunner, L.L.P.

[57] ABSTRACT

A detector for detecting the maximum/minimum diaphragm adjustment value of an exchange lens of a camera includes a bar code, in which the maximum/minimum diaphragm adjustment value of an exchange lens is printed in a binary code, formed on the lens and a bar code reader on the camera for reading and decoding the bar code. The bar code reader outputs an electric pulse signal corresponding to the bar code by radiating a fixed scanning line at the bar code.

10 Claims, 4 Drawing Sheets

*1 2 3 4 5 F* a 1 2 3 4 5 7 a 1 2 3 4 5 7

4 1 2  3  4 5 6 1 2 3 4 5 6 4

DETECTOR USING BAR CODE FOR DETECTING THE MAXIMUM/MINIMUM DIAPHRAGM ADJUSTMENT VALUE OF AN EXCHANGE LENS

This application is a continuation of application Ser. No. 08/630,850, filed Apr. 11, 1996, now abandoned.

BACKGROUND OF THE INVENTION

1. Field of the Invention

The present invention relates generally to cameras that use an exchange lens, and more particularly, to cameras having a detector for detecting the maximum/minimum diaphragm adjustment value of an exchange lens.

2. Discussion of the Related Art

Generally, a single-lens reflex camera may have multiple performance modes, which use diaphragm area and shutter speed as variables: (1) a manual mode where a user controls a diaphragm adjustment value and shutter speed; (2) a diaphragm-priority mode where the camera control unit automatically controls shutter speed according to outside light after adjusting the diaphragm to a definite value; (3) a shutter-priority mode where the camera control unit automatically controls the diaphragm according to outside light after adjusting the shutter speed to a definite speed; and (4) an automatic mode where the camera control unit controls the diaphragm value and shutter speed according to outside light.

When selecting the shutter-priority mode and the automatic mode, the camera control unit should perceive the maximum/minimum diaphragm adjustment value of an attached lens so that the diaphragm adjustment value may be controlled properly in the limit area of the lens. The diaphragm adjustment value may vary according to the type of lens.

An operating system in a conventional detector for detecting the maximum/minimum diaphragm adjustment value of an exchange lens is shown in FIG. 1. A camera 100 employing an exchange lens 102 is composed of a diaphragm control ring 104 attached to the exchange lens to control the opening and shutting quantity. The diaphragm control ring includes projection parts 106, 108, which engage a maximum diaphragm adjustment value perception shaft 110 on the camera when the exchange lens is mounted on the camera.

When the exchange lens is attached to the camera, the projection part 108 is in contact with a diaphragm adjustment value perception shaft 112. Accordingly, if a user rotates the diaphragm control ring 104 in the Z direction, the diaphragm adjustment value perception shaft 112 is interlocked with part 22 and is rotated in the Y direction. At this time, the diaphragm adjustment value perception shaft 112 is located within the range between the maximum diaphragm adjustment value and the minimum diaphragm adjustment value of the lens.

The diaphragm adjustment value perception shaft 112 is electrically connected to an interior rheostat (not shown) and inputs a signal into the camera control unit corresponding to a variable resistance value determined by the position shift of the shaft 112. The value corresponding to the pattern position change of the position shift of the shaft 112 relative to a fixed pattern is also inputted into the control unit. Accordingly, if the position of a diaphragm control ring 104 is fixed, the position of shaft 112 is set by being interlocked with it. At this time, a diaphragm adjustment value may be perceived as a consequence of the corresponding signals input into the camera control unit.

When an exchange lens is joined to the camera at the stage in which a diaphragm adjustment value control ring 104 is located at the maximum diaphragm adjustment value, projection part 106 is in contact with the maximum diaphragm adjustment value perception shaft 110 and is rotated in the Y direction. When the lens is joined to the camera at a stage other than the maximum diaphragm adjustment value, the maximum diaphragm adjustment value perception shaft 110 is rotated in the Y direction by a projection part 106, if a user rotates a diaphragm control ring 104 toward the maximum diaphragm adjustment value after joining the lens with the camera. The maximum diaphragm adjustment shaft 110 and the projection part 106 are not joined at the range except the maximum diaphragm adjustment value, are joined only at the maximum diaphragm adjustment value, and perceive the maximum diaphragm adjustment value.

The shaft 110 is electrically connected with a variable rheostat and/or a fixed pattern in the same manner as the shaft 112, and inputs an electrical signal into the camera control unit corresponding to the position fixed according to the direction of movement. The minimum diaphragm adjustment value may be interpreted by reading the minimum diaphragm adjustment value corresponding with the maximum diaphragm adjustment value.

Such a conventional detector is disadvantageous because the many components used to connect the camera and lens and perceive the maximum/minimum diaphragm adjustment value may generate loss, e.g., drawing and components work. Also, although various lenses have the same maximum diaphragm adjustment value, there are many cases where the minimum diaphragm adjustment values differ. Thus, errors in reading the minimum diaphragm adjustment value of a lens according to the perceived maximum diaphragm adjustment value are likely to occur.

SUMMARY OF THE INVENTION

The present invention is directed to a detector that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof, as well as the appended drawings.

To achieve these and other advantages, and in accordance with the purpose of the invention as embodied and broadly described, the detector includes a bar code on the exchange lens, the bar code representing the maximum/minimum diaphragm adjustment value of an exchange lens in a binary code; and a bar code reader on the camera and facing the bar code when the exchange lens is attached to the camera, for reading the bar code and outputting a signal corresponding to the bar code.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate an embodiment of the invention, and, together with the description, serve to explain the principles of the invention.

DETAILED DESCRIPTION OF THE PREFERRED EMBODIMENT

Figure 1:
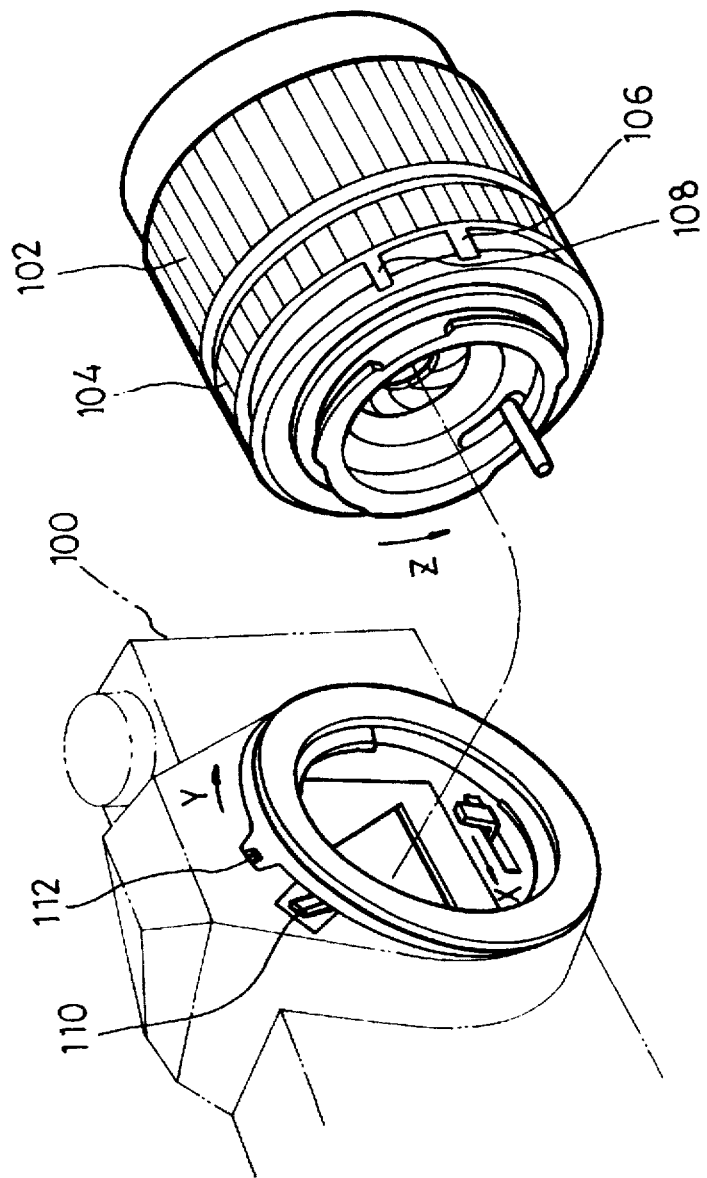
FIG. 1 is a perspective view illustrating a conventional detector for detecting the maximum/minimum diaphragm adjustment value of an exchange lens.

Reference will now be made in detail to a preferred embodiment of the invention, an example of which is illustrated in the accompanying drawings. Wherever possible, the same reference characters will be used throughout the drawings to refer to the same or like parts.

Figure 2:
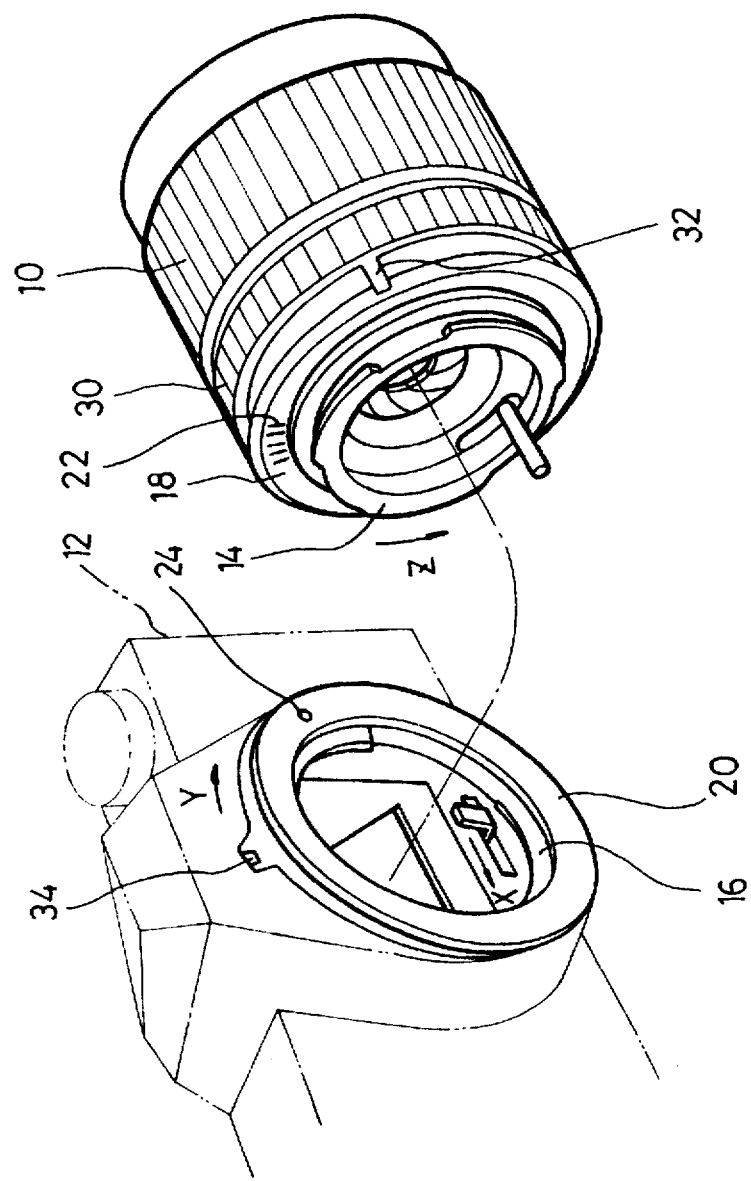
FIG. 2 is a perspective view illustrating a detector for detecting the maximum/minimum diaphragm adjustment value of an exchange lens according to a preferred embodiment of the present invention.

A detector according to a preferred embodiment of the present invention is illustrated in FIG. 2. An exchange lens 10 is connectable to a camera 12 by engaging and mating a lens flange 14 with a corresponding groove 16 in camera. When joined, base 18 of the lens abuts and faces base 20 of the camera.

The lens includes a diaphragm control ring 30 for adjusting the diaphragm. The control ring includes a projection 32 that interlocks with a position shaft 34 when the lens and camera are joined, thus allowing the diaphragm position to be monitored by a camera control unit.

The detector of the present invention includes a bar code 22 printed or otherwise formed on base 18. A bar code reader 24 is similarly positioned on camera base 20 to read the bar code when the camera and lens are joined. The bar code reader, which is composed of photoelectric elements known in the art, outputs an electric pulse signal corresponding to a perceived number by radiating a scanning line to read the bar code 22.

Generally, a bar code denotes a number or a word expressed in a binary code by a combination of thick and thin white or black lines. By assigning a logical value 1, 0 to a thick or a thin white or black line and printing the binary code as a serial signal, a bar code reader can decode the bar code by radiating the bar code at a uniform speed. The resultant electric signal is similar to Morse code, and is decoded into a corresponding word or number by being compounded.

Presently, at least four kinds of bar codes are commonly used. The types of bar codes illustrated in FIGS. 4A to 4D may be described according to the properties in Table 1.

TABLE 1

| FIG. | Code name | Expression letter | Message length | Letter Density letter/inch | Minimum bar/mm | Feature |
|---|---|---|---|---|---|---|
| 4A | code 3 of 9 | capital numeral $/%+− | variable | (H) 9.4 (M) 5.2 (L) 0.53 | 0.19 0.3 0.53 | abundant number of letters for industry |
| 4B | NW7 | numeral −$/.+ | variable | (H) 10.0 (M) 5.0 | 0.17 0.33 | for library, medical |

TABLE 1-continued

| FIG. | Code name | Expression letter | Message length | Letter Density letter/inch | Minimum bar/mm | Feature |
|---|---|---|---|---|---|---|
|  |  | abcde |  | (L) 3.3 | 0.53 | institution, photo |
| 4C | Interleaved 2 of 5 | numeral | variable | (H) 18.0 (M) 9.3 (L) 5.3 | 0.19 0.3 0.53 | possible to raise the letter density |
| 4D | UPC EAN JAN | numeral | fixed 8 lines 13 lines |  | 1.26− 0.33− 0.66 | common goods code throughout the world |

Figure 3:
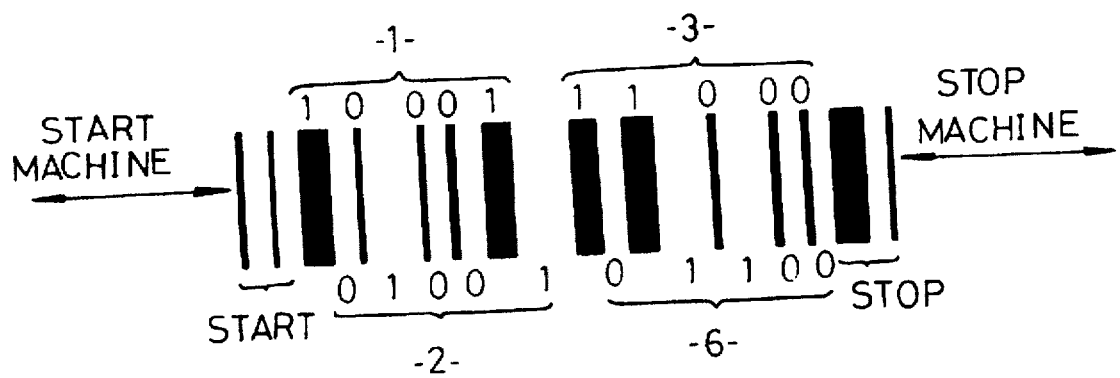
FIG. 3 is a diagram illustrating an exemplary bar code for use with the detector shown in FIG. 2.
Figure 4A:
FIGS. 4A to 4D are diagrams illustrating various types of bar codes for use with the detector shown in FIG. 2.
Figure 4B:
Figure 4C:
Figure 4D:

The bar code illustrated in FIG. 3 is a code expressed in an Interleaved Two of Five (ITF) format representing the number "1236". As illustrated in FIG. 3, a white margin indicates a "start machine" or start position. Two thin black lines express the beginning of the bar code, and thick and thin black lines represent the stop position.

TABLE 2

| Numeral | Code | Number | Code |
|---|---|---|---|
| 0 | 00110 | 5 | 10100 |
| 1 | 10001 | 6 | 01100 |
| 2 | 01001 | 7 | 00011 |
| 3 | 11000 | 8 | 10010 |
| 4 | 00101 | 9 | 01010 |

As shown in Table 2, a numeral is composed of five elements (5 lines) including two thick lines (a numeral always includes 2 thick lines).

"1" in the number "1236" is expressed as "10001," as shown in Table 2. As illustrated in FIG. 3, a thick black line expresses "1", a thin black line expresses "0", and the compounding of the two lines expresses "10001." Then, the next number, "2", is expressed by thick and thin white lines. As illustrated in FIG. 3, "01001" is expressed by expressing a thick white line as "1" and a thin white line as "0". The numbers "3" and "6" are expressed by the same methods as "1" and "2", respectively, as illustrated in FIG. 3.

The maximum/minimum diaphragm adjustment value of a lens is expressed with a bar code expression according to a preferred embodiment of the present invention and is printed on the lens base. In other words, the maximum/minimum diaphragm adjustment value of an exchange lens is expressed as four figures, according the ITF method. For example, if the minimum diaphragm adjustment value of an exchange lens is "2.8" and the maximum diaphragm adjustment value is "22", it is expressed as "2822" in the bar code. If the minimum diaphragm adjustment value of an appropriate exchange lens is "2" and the maximum diaphragm adjustment value of one is "22", it is expressed as "0222" in the bar code.

The bar code reader 24 reads the value corresponding to the maximum/minimum diaphragm adjustment value of a joined exchange lens and outputs an electric signal. A camera control unit (not shown) deciphers the maximum/minimum diaphragm adjustment value of a joined exchange lens by compounding signals generated from the bar code reader 24. Accordingly, the camera control unit of adjusts the diaphragm adjustment value of an exchange lens according to the deciphered maximum/minimum diaphragm adjustment value of an exchange lens, when a shutter-priority mode or an automatic mode is chosen.

As described above, the present invention provides a detector for detecting the maximum/minimum diaphragm adjustment value of an exchange lens by reading the diaphragm adjustment value, which is expressed in bar code, with a bar code reader. The detector simplifies construction and increases accuracy by eliminating additional parts needed in conventional cameras for detecting a diaphragm adjustment value.

It will be apparent to those skilled in the art that various modifications and variations can be made in the disclosed product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. Apparatus for indicating the maximum/minimum diaphragm adjustment value of a lens, comprising:

a lens, detachably mounted on a camera body, and including a plurality of adjustment positions and a surface containing a bar code indicating the maximum/minimum diaphragm adjustment value of the lens, the bar code comprising a binary code having thick lines and thin lines; and a bar code reader, attached to the camera body, for outputting an electric pulse signal corresponding to the bar code by radiating a fixed scanning line to the bar code when the lens is mounted on the camera, the bar code reader simultaneously outputting the maximum/minimum diaphragm adjustment value indicated in the bar code for all adjustment positions of the lens.

2. The apparatus of claim 1, wherein the bar code is expressed and printed in Interleaved Two of Five (ITF) format.

3. The apparatus of claim 2, wherein the number corresponding to the minimum diaphragm adjustment value is expressed as the first two figures of the bar code and the number corresponding to the maximum diaphragm adjustment value is expressed as the next two figures of the bar code.

4. The apparatus of claim 1, wherein the bar code reader comprises photoelectric elements.

5. A camera, comprising:

a camera body, including a lens mount;

a lens removably attached to said camera body, said lens having a plurality of adjustment positions and including an engagement portion for engaging the lens mount to attach said lens to the camera, a base surface of the lens engagement portion including a bar code, said bar code representing the maximum/minimum diaphragm adjustment value of said lens in a binary code; and a bar code reader disposed on the lens mount of said camera body in position to read said bar code when said lens is attached to said camera body and outputting a signal indicating the maximum/minimum diaphragm adjustment value for said lens, the bar code reader simultaneously outputting the maximum/minimum diaphragm adjustment value indicated in the bar code for all adjustment positions of the lens.

6. The camera of claim 5, wherein said bar code is expressed and printed in Interleaved Two of Five (ITF) format.

7. The camera of claim 6, wherein the number corresponding to the minimum diaphragm adjustment value is expressed as the first two figures and a number corresponding to the maximum diaphragm adjustment value is expressed as the next two figures of said bar code.

8. The camera of claim 5, wherein said bar code reader includes photoelectric elements.

9. The camera of claim 5, further comprising:

a diaphragm for receiving the signal from said bar code reader indicating the maximum/minimum diaphragm adjustment value for said lens, wherein a value of said diaphragm varies from the minimum diaphragm adjustment value to the maximum diaphragm adjustment value in accordance with the signal.

10. The apparatus of claim 1, wherein the camera includes a diaphragm for receiving the electric pulse signal from said bar code reader, and wherein a value of the diaphragm varies from the minimum diaphragm adjustment value to the maximum diaphragm adjustment value in accordance with the electric pulse signal.

* * * * *